United States Patent
Feigel et al.

(10) Patent No.: US 9,205,824 B2
(45) Date of Patent: Dec. 8, 2015

(54) BRAKE SYSTEM FOR MOTOR VEHICLES AND METHOD FOR OPERATING THE BRAKE SYSTEM

(75) Inventors: Hans-Jörg Feigel, Rosbach (DE); Harald Biller, Eschborn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 109 days.

(21) Appl. No.: 14/112,446

(22) PCT Filed: Apr. 16, 2012

(86) PCT No.: PCT/EP2012/056867
§ 371 (c)(1),
(2), (4) Date: Jan. 10, 2014

(87) PCT Pub. No.: WO2012/143310
PCT Pub. Date: Oct. 26, 2012

(65) Prior Publication Data
US 2014/0110997 A1    Apr. 24, 2014

(51) Int. Cl.

| | |
|---|---|
| B60T 13/74 | (2006.01) |
| B60T 13/62 | (2006.01) |
| B60T 13/68 | (2006.01) |
| B60T 8/40 | (2006.01) |
| B60T 8/44 | (2006.01) |
| B60T 7/04 | (2006.01) |

(Continued)

(52) U.S. Cl.
CPC ................. *B60T 13/62* (2013.01); *B60T 7/042* (2013.01); *B60T 7/12* (2013.01); *B60T 8/4072* (2013.01); *B60T 8/4081* (2013.01); *B60T 8/442* (2013.01); *B60T 13/161* (2013.01); *B60T 13/686* (2013.01); *B60T 13/745* (2013.01)

(58) Field of Classification Search
CPC ..... B60T 13/142; B60T 13/588; B60T 13/58; B60T 13/66; B60T 13/686; B60T 13/745; B60T 8/4081; B60T 8/4072
See application file for complete search history.

(56) References Cited

U.S. PATENT DOCUMENTS

| | | | |
|---|---|---|---|
| 2008/0223670 A1 | 9/2008 | Toyohira et al. | |
| 2009/0199555 A1 * | 8/2009 | Hatano | ........................... 60/545 |

(Continued)

FOREIGN PATENT DOCUMENTS

| | | | |
|---|---|---|---|
| DE | 4310061 A1 * | 9/1994 | |
| DE | 195 38 794 A1 | 4/1997 | |

(Continued)

OTHER PUBLICATIONS

PCT International Search Report—Jul. 20, 2012.

(Continued)

*Primary Examiner* — Anna Momper
(74) *Attorney, Agent, or Firm* — Brinks Gilson & Lione (57) ABSTRACT

A motor vehicle brake system and method operable in a brake by wire and in a fallback operating mode. In addition to a first pressure supply unit a second electrically controllable pressure supply unit having at least one intake port and one pressure port, the intake port of which is connected or connectable to one of the pressure chambers and the pressure port of which is connectable or connected to the brake circuit associated with the pressure chamber. The second pressure supply unit is arranged in the hydraulic connection between one of the pressure chambers of the brake master cylinder and the brake circuit associated with the pressure chamber.

15 Claims, 2 Drawing Sheets

(51) Int. Cl.
  *B60T 7/12* (2006.01)
  *B60T 13/16* (2006.01)

(56) References Cited

U.S. PATENT DOCUMENTS

| | | | |
|---|---|---|---|
| 2009/0229931 A1* | 9/2009 | Baumann et al. | 188/72.2 |
| 2011/0241419 A1* | 10/2011 | Ohkubo et al. | 303/9.62 |
| 2012/0112525 A1* | 5/2012 | Shimada | 303/10 |
| 2012/0193975 A1* | 8/2012 | Ishii | 303/14 |
| 2012/0326491 A1* | 12/2012 | Gotoh et al. | 303/6.01 |

FOREIGN PATENT DOCUMENTS

| | | | |
|---|---|---|---|
| DE | 195 43 582 A1 | | 6/1997 |
| DE | 10 2008 010 528 A1 | | 9/2008 |
| DE | 10 2009 031 392 A1 | | 1/2010 |
| DE | 102010020002 A1 | * | 11/2011 |
| EP | 0 485 367 A2 | | 6/1989 |
| EP | 1 334 893 A2 | | 8/2003 |
| EP | 2 520 473 A1 | | 11/2012 |
| JP | 2010-52504 | | 3/2010 |
| WO | 00/34097 A1 | | 6/2000 |
| WO | WO 2010007119 A2 | * | 1/2010 |
| WO | WO 2011/029812 A1 | | 3/2011 |

OTHER PUBLICATIONS

PCT International Search Report—Jul. 25, 2012.

* cited by examiner

BRAKE SYSTEM FOR MOTOR VEHICLES AND METHOD FOR OPERATING THE BRAKE SYSTEM

CROSS REFERENCE TO RELATED APPLICATIONS

This application claims priority to German Patent Application Nos. 10 2011 007 655.7, filed Apr. 19, 2011, 10 2012 205 859.1, filed Apr. 11, 2012, and PCT/EP2012/056867, filed Apr. 16, 2012.

FIELD OF THE INVENTION

The invention relates to a brake system for motor vehicles and to a method for operating such a brake system.

BACKGROUND

Hydraulic vehicle brake systems are known which are configured to be operable by external force and which include, in addition to a brake master cylinder actuable by muscle power to which wheel brakes are connected hydraulically and which supplies pressure and volume for actuating wheel brakes, a further, electrically controllable pressure and volume supply unit which activates the wheel brakes in a brake-by-wire operating mode. In the event of failure of the electrically controllable pressure and volume supply unit, the wheel brakes are actuated solely by the muscle power of the vehicle driver (unboosted fallback operating mode).

An electrohydraulic brake system comprising a brake master cylinder actuable by the brake pedal, a travel simulator and a pressure supply unit is known from WO 2011/029812 A1. In a brake-by-wire operating mode the wheel brakes are subjected to pressure by the pressure supply unit. In the fallback operating mode the wheel brakes are subjected to the pressure exerted by the driver by means of the brake master cylinder actuable by the brake pedal. It is considered disadvantageous in the known brake system that, in the event of failure of the activation or drive of the electrically controllable pressure supply unit, large brake pedal forces must be exerted by the driver in order to attain sufficient deceleration using the service brake.

SUMMARY AND INTRODUCTORY DESCRIPTION

It is therefore the object of the present invention to improve a brake system of the type mentioned in the introduction in such a way that the vehicle driver can comfortably achieve sufficient service brake deceleration despite failure of the pressure supply unit.

This object is achieved according to the invention by a brake system as described herein.

The invention is based on the concept of providing a second electrically controllable pressure supply unit having at least one intake port and one pressure port, the intake port of which is connected or connectable to one of the pressure chambers and the pressure port of which is connectable or connected to the brake circuit associated with the pressure chamber. In other words, the second pressure supply unit is arranged in the hydraulic connection between one of the pressure chambers of the brake master cylinder and the brake circuit associated with the pressure chamber.

An advantage of the invention is that boosting of the pressure generated in the brake master cylinder by the vehicle driver can be effected by means of the second pressure supply unit, so that the vehicle driver can achieve sufficient service brake deceleration comfortably, in particular without large brake pedal force, despite failure of the first pressure supply unit.

According to a preferred embodiment of the brake system according to the invention, for each brake circuit a second electrically controllable pressure supply unit is arranged hydraulically in the connection between the pressure chamber and the brake circuit.

The first electronic control and regulation unit is preferably configured to activate the electrically controllable pressure supply unit with the effect of regulating or controlling the hydraulic pressure delivered by the unit. Furthermore, the isolation valves and sequence valves, and the simulator release valve of the brake system, are advantageously regulated or controlled by the first control and regulation unit.

The brake system preferably includes an inlet valve and an outlet valve per wheel brake for setting wheel-individual brake pressures which are derived from the brake circuit pressures associated with the brake circuits, the inlet valves transmitting the brake circuit pressure to the wheel brakes in the unactivated state and limiting or preventing a build-up of wheel brake pressure in the activated state, and the outlet valves preventing an outflow of pressure medium from the wheel brakes to a pressure medium reservoir in the unactivated state and permitting and controlling said outflow in the activated state, the inlet valves being closed, so that a reduction of wheel brake pressure takes place.

The inlet valves and outlet valves are preferably also activated by the first electronic control and regulation unit.

The isolation valve is in each case preferably arranged in a hydraulic connecting line between the pressure chamber and the brake circuit or the brake circuit supply line, and thus enables selective closing or opening of the hydraulic connection between pressure chamber and brake circuit. Especially preferably, the isolation valves are configured to be open when unenergized (normally open), so that, in a currentless fallback operating mode, the brake circuits are hydraulically connected to the brake master cylinder and can thus be subjected to pressure by the vehicle driver.

The sequence valve is in each case preferably arranged in a hydraulic connecting line between the first pressure supply unit and the brake circuit or the brake circuit supply line, and thus enables selective opening or closing of the hydraulic connection between first pressure supply unit and brake circuit. Especially preferably, the sequence valves are configured to be closed when unenergized (normally closed), so that, in a currentless fallback operating mode, the brake circuit is hydraulically isolated from the first pressure supply unit.

The simulation device, which communicates the usual brake pedal feel to the vehicle driver in the brake-by-wire operating mode, is hydraulically connected to one of the pressure chambers of the brake master cylinder. The effect of the simulation device can be switched on and off by means of the simulator release valve. In both the unboosted and the boosted fallback operating mode, the simulation device is advantageously switched off.

The first electrically controllable pressure supply unit is preferably formed by a cylinder-piston arrangement the piston of which can the actuated by an electromechanical actuator. Such an electrohydraulic actuator operates in an especially dynamic and very quiet manner and withstands without difficulty the load change values required for brake systems.

According to an advantageous development of the brake system according to the invention, the second pressure supply unit is arranged in a hydraulic connecting line between the isolation valve and the associated brake circuit or, for each brake circuit, in the hydraulic connecting line between the isolation valve and the brake circuit.

The second pressure supply unit is preferably arranged hydraulically between the isolation valve and the associated brake circuit, the intake port being connected to the outlet port (port facing away from the brake master cylinder) of the isolation valve and the pressure port to the inlet port (port facing away from the wheel brake) of the inlet valve associated with the brake circuit, or to the inlet ports of the inlet valves associated with the brake circuit.

The second pressure supply unit preferably includes at least two hydraulic pumps driven by an electric motor, the intake ports of the first and second pumps each being connected or connectable to one of the pressure chambers of the brake master cylinder and the pressure ports of the first and second pumps being connectable or connected to the associated brake circuit. In the case of the above-mentioned, preferred arrangement downstream of the isolation valves, the intake ports of the first and second pumps are in each case connected to the outlet port of one of the isolation valves. Dual-circuit motor-pump units are known, as return pumps, in conventional brake systems and can generate high system pressures while being of compact overall size.

For the pumps connected or connectable to the pressure chambers, it is preferred to provide in each case an electrically actuable control valve which is connected in parallel with the pump. By means of the control valves and, optionally, a speed control system for the electric motor driving the pumps, the desired, boosted reference pressure can be set for each brake circuit. Especially preferably, the control valves are configured to be controllable by analog means, so that the desired reference pressure can be set by a valve flow control system.

A non-return valve, which enables pressure medium to flow from the pressure chamber of the brake master cylinder to the brake circuit independently of the switching state of the control valve, is preferably connected in parallel to each control valve. The non-return valves permit rapid brake pressure build-up by the vehicle driver.

According to a preferred development of the brake system according to the invention, the second pressure supply unit includes a third pump, the intake port of which is connected to a pressure medium reservoir and the output volume flow of which is interconnected with the output volume flow of one of the other pumps. A volume boost in addition to the pressure boost is therefore possible in the corresponding brake circuit.

The second pressure supply unit, the control valves and the non-return valves are preferably arranged in an independent assembly. This makes it possible to produce the brake system selectively with or without pressure boost option in a cost-effective manner.

According to a development of the invention, the brake system includes a second electronic control and regulation unit for activating the second pressure supply unit and the control valves. The second electronic control and regulation unit is advantageously integrated in the independent assembly.

In order to be able to detect a driver's braking request even in the event of failure of the first control and regulation unit, there is preferably provided a pressure detection device which detects the pressure at an intake port of the second pressure supply unit which is connected or connectable to a pressure chamber. Especially preferably, the pressure detection device is also arranged in the independent assembly. The output signals of the pressure detection device are advantageously supplied to the second electronic control and regulation unit for evaluation, so that the independent assembly can carry out both recognition of the driver's braking request and a corresponding pressure boost by means of the second pressure supply unit and the control valves.

According to a preferred embodiment of the brake system according to the invention, the first electronic control and regulation unit is connected via a data line to the second electronic control and regulation unit. The first control and regulation unit transmits to the second control and regulation unit via the data line a confirmation signal regarding the possibility of a pressure build-up or a pressure reduction by means of the first pressure supply unit. In the event that the first pressure supply unit or its activation is faulty, or a current supply to the first pressure supply unit or to the isolation valves, the sequence valves or the simulator valve is not possible, it can be detected with reference to the absence of a confirmation signal for the second control and regulation unit that in some cases a pressure boost by means of the second pressure supply unit is necessary.

In order to be able to maintain a pressure-boosted fallback operating mode in the event of failure of the on-board network, the second pressure supply unit, the control valves, the pressure detection device, the second electronic control and regulation unit and especially preferably the independent assembly, are preferably supplied with energy by an independent electrical energy source.

The brake system preferably further includes at least one pressure sensor for detecting a pressure of the brake master cylinder and a pressure sensor for detecting the pressure of the first pressure supply unit. In addition, the brake system advantageously includes a travel or angle sensor for detecting a position of the first pressure supply unit, and a travel or angle sensor for detecting a brake pedal actuation. The signals of the four aforementioned sensors are processed by the first electronic control and regulation unit.

The invention also relates to a method for operating a brake system according to the invention. For this purpose—advantageously if a pressure build-up or pressure reduction cannot be carried out by means of the first pressure supply unit, or if a malfunction of one of the components needed for the brake-by-wire operating mode is detected, for example if a failure of the first electrically controllable pressure supply unit or its activation is detected, and the driver actuates the brake pedal—pressure medium is drawn from the pressure chamber or pressure chambers of the brake master cylinder by means of the second electrically controllable pressure supply unit and is fed in a pressure-boosted manner to the associated brake circuit or the associated brake circuits.

In order to detect a malfunction of one of the components needed for the brake-by-wire operating mode, the first control and regulation unit preferably outputs a confirmation signal to a second control and regulation unit configured to activate the second pressure supply unit, for as long as a pressure build-up or pressure reduction can be carried out by means of the first pressure supply unit.

It is preferred to recognise an actuation of the brake pedal by means of a pressure detection device which detects the pressure at an intake port of the second pressure supply unit which is connected or connectable to a pressure chamber. The output signal of the pressure detection device is advantageously outputted to the second control and regulation unit and evaluated in the second control and regulation unit. The travel or angle sensor normally used for brake pedal actuation and arranged in the region of the brake pedal or of a brake master cylinder piston is not available, for example, in the event of power failure of the on-board network supplying the first control and regulation unit, so that an independent pressure sensor is advantageous. Alternatively or additionally, it is preferred that the travel or angle sensor (in the region of the brake pedal or of a brake master cylinder piston) for detecting a brake pedal actuation is implemented in a redundant or duplicated manner in such a way that an output signal of the travel or angle sensor is available to the second control and regulation unit even if an output signal cannot be supplied to the first control and regulation unit.

According to a preferred embodiment of the method according to the invention, the second pressure supply unit is in the form of a motor-pump unit, and control of the pressure medium flow emitted by the motor-pump unit is carried out by means of speed regulation of the motor pump unit or by means of valve flow regulation of a control valve, which is advantageously activatable by analog means, connected in parallel to a pump of the motor-pump unit.

BRIEF DESCRIPTION OF THE DRAWINGS

Preferred embodiments of the invention are apparent from the following description with reference to the figures, in which.

FURTHER DETAILED DESCRIPTION

Figure 1:
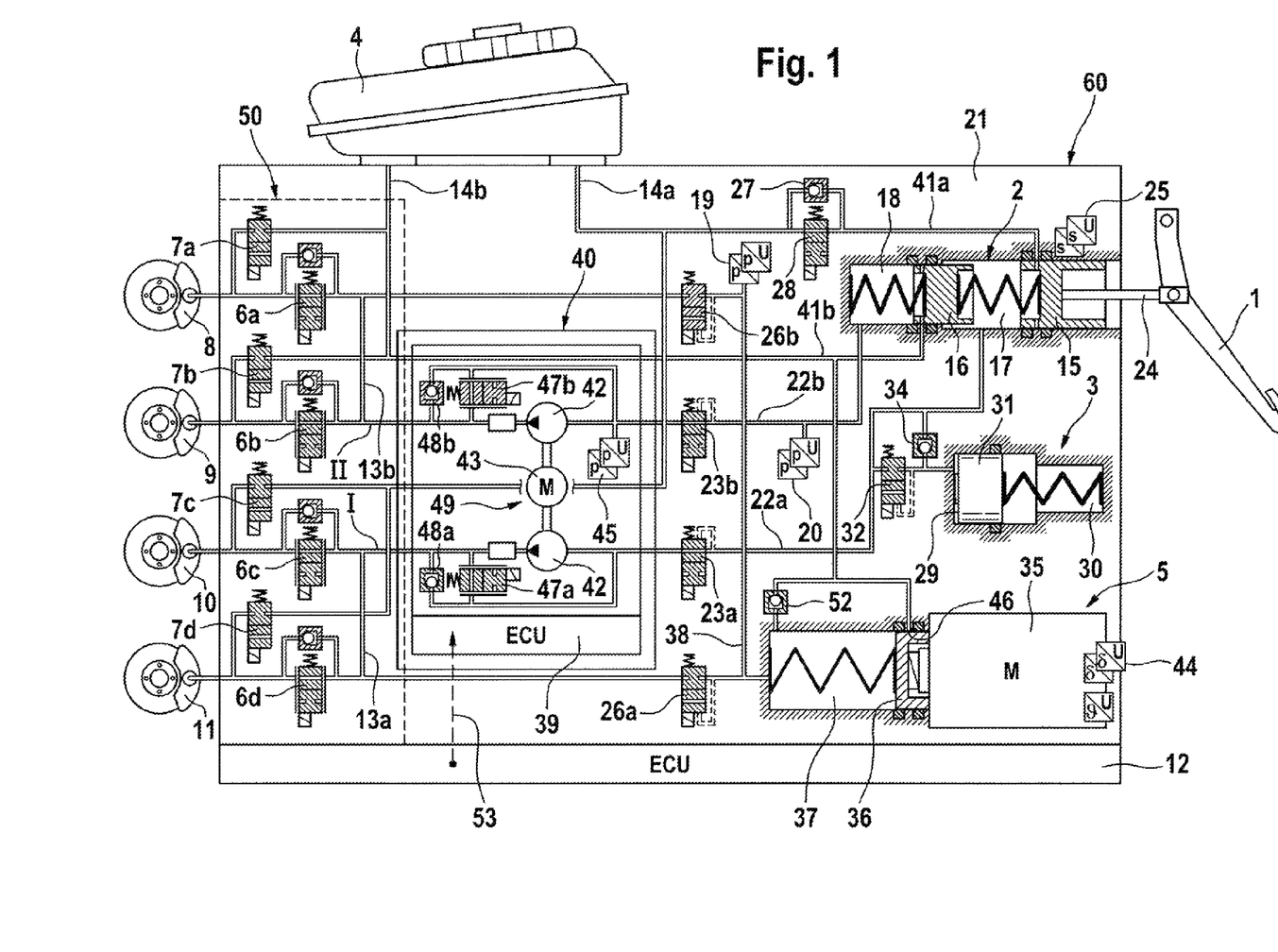
FIG. 1 shows schematically a first exemplary embodiment of a brake system according to the invention.

FIG. 1 shows schematically a first exemplary embodiment of a brake system according to the invention. The brake system comprises essentially a hydraulic actuation unit 2 which can be actuated by means of an actuating or brake pedal 1, a travel simulator or simulation device 3 which cooperates with the hydraulic actuation unit 2, a pressure medium reservoir 4 associated with the hydraulic actuation unit 2 and exposed to atmospheric pressure, a first electrically controllable pressure supply unit 5, a second electrically controllable pressure supply unit 49, an electronic control and regulation unit 12 and an electrically controllable pressure modulation device 50.

In the example, the pressure modulation device 50 comprises for each wheel brake 8, 9, 10, 11 of a motor vehicle (not shown) an inlet valve 6a-6d and an outlet valve 7a-7d which are connected together hydraulically in pairs via center connections and are connected to the wheel brakes 8, 9, 10, 11. The inlet connections of the inlet valves 6a-6d are supplied with pressures by means of brake circuit supply lines 13a, 13b, which pressures are derived in a brake-by-wire operating mode from a system pressure which is present in a system pressure line 38 connected to a pressure chamber 37 of the first electrically controllable pressure supply unit 5. A respective non-return valve, not designated further, which opens towards the brake circuit supply lines 13a, 13b, is connected in parallel with the inlet valves 6a-6d. In an unboosted fallback operating mode the brake circuit supply lines 13a, 13b are subjected to the pressures of the pressure chambers 17, 18 of the actuation unit 2 via hydraulic lines 22a, 22b. The outlet connections of the outlet valves 7a-7d are connected in pairs via return lines 14a, 14b to the pressure medium reservoir 4. In order to detect the pressure prevailing in the system pressure line 38, a preferably redundantly implemented pressure sensor 19 is provided. In the example, the wheel brakes 8 and 9 are associated respectively with the left front wheel and the right rear wheel and the wheel brakes 10 and 11 are associated respectively with the left rear wheel and the right front wheel. Other circuit distributions are also possible.

The inlet and outlet valves 6a-6d, 7a-7d, parts of the brake circuit supply lines 13a, 13b and parts of the return lines 14a, 14b may be combined to form an independent electrohydraulic module and then form the pressure modulation device 50, which is indicated very schematically by the broken line in FIG. 1. The pressure modulation device 50 comprises for each brake circuit I, II a hydraulic connection for connecting to the system pressure line 38, a hydraulic connection for connecting to the line 22a, 22b to the actuation unit 2 and a hydraulic connection for connecting to the return line 14a, 14b.

The hydraulic actuation unit 2 comprises two pistons 15, 16 which are arranged one behind the other in a housing 21 and delimit the hydraulic chambers or pressure chambers 17, 18 which, together with the pistons 15, 16, form a dual-circuit brake master cylinder or a tandem master cylinder. The pressure chambers 17, 18 are connected on the one hand, via radial bores formed in the pistons 15, 16 and corresponding pressure compensation lines 41a, 41b, to the pressure medium reservoir 4 (via the return lines 14a, 14b), said lines being blockable by relative movement of the pistons 17, 18 in the housing 21, and, on the other, by means of the hydraulic lines 22a, 22b to the aforementioned brake circuit supply lines 13a, 13b, via which the pressure modulation unit 50 is connected to the actuation unit 2. A parallel connection of a currentlessly open (normally open-SO) diagnostic valve 28 and a non-return (check) valve 27 which closes towards the pressure medium reservoir 4 is contained in the pressure compensation line 41a. The pressure chambers 17, 18 contain return springs, not designated further, which position the pistons 15, 16 in a starting position with the brake master cylinder 2 unactuated. A piston rod 24 couples the swiveling movement of the brake pedal 1 resulting from a pedal actuation to the translational movement of the first (master cylinder) piston 15, the actuation travel of which is detected by a preferably redundantly implemented travel sensor 25. The corresponding piston travel signal is thus a measure for the brake pedal actuation angle. It represents a braking request of a vehicle driver.

A respective isolation valve 23a, 23b in the form of an electrically actuable, preferably currentlessly open (normally open-SO) 2/2-wave valve in each case, is arranged in the line sections 22a, 22b connected to the pressure chambers 17, 18. The hydraulic connection between the pressure chambers 17, 18 and the brake circuit supply lines 13a, 13b and the pressure modulation unit 50 can be blocked by the isolation valves 23a, 23b. A pressure sensor 20 connected to the line section 22b detects the pressure built up in the pressure chamber 18 through displacement of the second piston 16.

The travel simulator 3 is coupled hydraulically to the brake master cylinder 2 and is configured, for example, as an independent assembly consisting essentially of a simulator chamber 29, a simulator spring chamber 30 and a simulator piston 31 separating the two chambers 29, 30 from one another. By means of an elastic element (for example, a spring), which is advantageously pretensioned, arranged in the simulator spring chamber 30, the simulator piston 31 bears against the housing 21. In the example, the simulator chamber 29 is connectable by means of an electrically actuable simulator release valve 32 to the first pressure chamber 17 of the tandem brake master cylinder 2. Alternatively, the simulator release valve may be configured to be actuable mechanically. On the basis of a pedal force and with the simulator release valve 32 activated, pressure medium flows from the brake master cylinder pressure chamber 17 into the simulator chamber 29. A non-return (check) valve 34 arranged hydraulically in anti-parallel with the simulator release valve 32 permits a largely unhindered return flow of pressure medium from the simulator chamber 29 to the brake master cylinder pressure chamber 17 independently of the switching state of the simulator release valve 32.

The first electrically controllable pressure supply unit 5 is in the form of a hydraulic cylinder-piston arrangement or a single-circuit electrohydraulic actuator, the piston 36 of which is actuable by a schematically indicated electric motor 35 via an interposed rotation-translation gear, also represented schematically. A rotor position sensor serving to detect the rotor position of the electric motor 35 and indicated only schematically is denoted by reference 44. A temperature sensor for sensing the temperature of the motor winding may additionally be used. The piston 36 delimits a pressure chamber 37. Two elastomeric sealing rings serve to seal the gap between piston 36 and pressure chamber wall, a connection 46 connected to the pressure medium reservoir 4 providing for wetting of the pressure-bearing elastomeric sealing ring on the drive side and for wetting of the media-separating elastomeric sealing ring on the hydraulic side.

The actuator pressure generated by the dynamic effect of the piston 36 on the pressure medium enclosed in the pressure chamber 37 is fed into the system pressure line 38 and is detected with the system pressure sensor 19. In the brake-by-wire operating mode the system pressure line 38 is connected via the sequence valves 26a, 26b to the brake circuit supply lines 13a, 13b. In this way, during normal braking, a build-up and reduction of wheel brake pressure takes place for all wheel brakes 8, 9, 10, 11. During the pressure reduction, the pressure medium previously displaced from the pressure chamber 37 of the actuator 5 into the wheel brakes 8, 9, 10, 11 flows back by the same route into the pressure chamber 37 of the actuator 5. By contrast, during braking with wheel-individually differing wheel brake pressures controlled with the aid of the modulation valves 6a-6d, 7a-7d, the proportion of pressure medium discharged via the outlet valves 7a-7d flows into the pressure medium reservoir 4. Entrainment of pressure medium into the pressure chamber 37 by retraction of the piston 36 with the sequence valves 26a, 26b closed is possible in that pressure medium can flow from the reservoir 4 into the actuator pressure chamber 37 via a feed valve 52 in the form of a non-return valve which opens in the flow direction to the actuator.

In addition, the brake system includes a second electronically controllable pressure supply unit 49, which is advantageously implemented in an independent module (so-called boost module) 40 with its own electronic control and regulation unit 39. In the event of failure of the first pressure supply unit 5, service-brake deceleration can nevertheless be achieved through activation of the second pressure supply unit 49. The boost module 40 or the pressure supply unit 49 is incorporated hydraulically in the lines 22a, 22b between the brake master cylinder 2 and the brake circuit supply lines 13a, 13b and the pressure modulation device 50. The pressure supply unit 49 therefore draws pressure medium from the pressure chambers 17, 18 of the brake master cylinder 2 and feeds the pressure medium discharged by it directly into the brake circuit supply lines 13a, 13b. The pressure supply unit 5, by contrast, feeds the pressure medium discharged by it into the system pressure line 38 which is isolated or can be isolated from the brake circuit supply lines 13a, 13b by the sequence valves 26a, 26b.

In the example, the pressure supply unit 49 includes two pumps 42 driven jointly by an electric motor 43. The suction sides of the pumps 42 are each connected hydraulically to the respective outlet connections of the isolation valves 23a, 23b, while the pressure sides of the pumps 42 are connected hydraulically to the brake circuit supply lines 13a, 13b and to the pressure modulation device 50, and therefore to the inlet connections of the inlet valves 6a-6d.

The motor-pump unit 42, 43 is preferably of the piston pump 42 type driven by the electric motor 43 via an eccentric, a design already commonly used as a return pump in known brake systems. It can generate especially high system pressures and can be of very compact overall size.

In the example, the boost module 40 comprises, in addition to the electronic control and regulation unit 39 and the motor-pump unit 42, 43, a pressure sensor 45 which is arranged on a suction side of a pump 42 and which, in the example, is arranged in the line 22b belonging to the second pressure chamber 18 (corresponding to brake circuit II), a respective control valve 47a, 47b connected in parallel to each pump 42, which control valves 47a, 47b are advantageously activatable by analog means and, in particular, are of currentlessly open (normally open) design, and respective non-return (check) valves 48a, 48b connected in parallel to the control valves 47a, 47b and opening in the direction of the wheel brakes 8, 9, 10, 11. The non-return valve 48a, 48b serves, above all, to enable rapid brake pressure build-up by the driver. The control and regulation unit 39 serves to activate the control valves 47a, 47b and the electric motor 43, and for the energy supply and signal evaluation of the pressure sensor 45.

The aforementioned components 2, 3, 5, 19, 20, 22a, 22b, 23a, 23b, 25, 26a, 26b, 27, 28, 32, 34, 38, 41a, 41b, 44, 46, 52 may be combined to form a second electrohydraulic module which is designated by reference 60. The electronic control and regulation unit 12 serves to activate the electrically actuable components of the module 60, in particular the valves 23a, 23b, 26a, 26b, 28, 32 and the electric motor 35 of the first pressure supply unit 5. The control and regulation unit 12 is also designed to activate the pressure modulation device 50. The signals of the sensors 19, 20, 25 and 44 are also processed in the electronic control and regulation unit 12. In order to be able to execute a travel-based activation of the second pressure supply unit 49 or of the module 40 in the event of failure of the electronic control and regulation unit 12, the travel sensor 25 is advantageously also connected to the electronic control and regulation unit 39 of the boost module 40 and is implemented, for example in a redundant or duplicated manner, in such a way that the travel sensor 25 can deliver a travel signal for controlling the second pressure supply unit 49 to the control and regulation unit 39 even in the event of failure of the control and regulation unit 12.

In a normal braking operation of the brake system (brake-by-wire operating mode), the brake master cylinder 2, and therefore the vehicle driver, is uncoupled from the wheel brakes 8, 9, 10, 11 by the closed isolation valves 23a, 23b, and the brake circuit supply lines 13a, 13b are connected via the open sequence valves 26a, 26b to the first pressure supply unit 5 which provides the system pressure for actuating the wheel brakes 8, 9, 10, 11. The simulation device 3 is switched on by the open simulator release valve 32, so that the pressure medium volume displaced in the brake master cylinder 2 by the actuation of the brake pedal 1 by the driver is taken up by the simulation device 3 and the simulation device 3 communicates an accustomed brake pedal feel to the vehicle driver.

In an unboosted fallback operating mode of the brake system, for example in the event of failure of the electrical energy supply of the entire brake system (for example, modules 40, 50 and 60), the simulation device 3 is switched off by the currentlessly closed simulator release valve 32 and the first pressure supply unit 5 is isolated by the currentlessly closed (normally closed) sequence valves 26a, 26b from the brake circuit supply lines 13a, 13b. The brake master cylinder 2 is connected, via the lines 22a, 22b with the currentlessly open (normally open) isolation valves 23a, 23b and with the currentlessly open control valves 47a, 47b, to the brake circuit supply lines 13a, 13b and therefore to the wheel brakes 8, 9, 10, 11, so that by actuating the brake pedal 1 the vehicle driver can build up pressure directly in the wheel brakes 8, 9, 10, 11. In a boosted fallback operating mode of the brake system (for example, in the event of failure of the control and regulation unit 12, in the event of failure of the electrical energy supply of the control and regulation unit 12 or of the module 60 or in the case of a defect of the first pressure supply unit 5), the components of the module 60 and possibly also of the pressure modulation module 50 remain unenergized, that is, the simulation device 3 is switched off by the closed simulator release valve 12, the first pressure supply unit 5 is isolated from the brake circuit supply lines 13a, 13b by the closed sequence valves 26a, 26b, and the brake master cylinder 2 is connected via the open isolation valves 23a, 23b to the boost module 40. Boosting of the driver's brake actuation is then carried out by means of the module 40 and the wheel brakes 8, 9, 10, 11 are subjected to an increased pressure as compared to a pressure applied by the driver.

In order to increase the availability of the boosted fallback operating mode of the brake system, the boost module 40 is preferably supplied by a second electrical energy supply (not shown) which is independent of the electrical energy supply (for example, the on-board network) which supplies the module 60 and/or the control and regulation unit 12.

The control and regulation unit 39 of the module 40 is connected via at least one data line to the central control and regulation unit 12. If the control and regulation unit 12 and the module 60 are operative, that is, if pressure can be built up by means of the pressure supply unit 5, the control and regulation unit 12 sends a positive confirmation signal ("i.O."/"in order" signal) to the control and regulation unit 39. This is indicated by the broken arrow 53 in FIG. 1. If the control and regulation unit 39 no longer receives a positive confirmation signal from the control and regulation unit 12, the boost module 40 is transferred to a readiness mode. If an actuation of the brake pedal 1 by the driver takes place in the readiness mode, this driver's braking request can be recognized by means of the pressure sensor 45 of the module 40. The control and regulation unit 39 then causes amplification of the pressure introduced by the driver in the brake master cylinder 2 by suitable activation of the second pressure supply unit 49 and of the control valves 47a, 47b. For this purpose the control valves 47a, 47b can be closed and the desired (boosted) reference pressure is set by speed control of the motor-pump unit 42, 43. Alternatively, the desired reference pressure can be set in the brake circuit supply line 13a, 13b and therefore in the wheel brakes 8, 1, 10, 11 by controlling the valve flows of the control valves 47a, 47b, which can be activated by analog means. The reference pressure is preferably calculated with reference to the brake master cylinder pressure measured by means of the pressure sensor 45 multiplied by a predefined emergency boost function, for example a linear function. If a pressure reduction is to be carried out, the pump 42 is switched off and the valve flows of the control valves 47a, 47b are adjusted correspondingly.

The exemplary brake system of FIG. 1 has the advantage that it can be produced cost-effectively, as the additional boost module 40 comprises few components, in particular only two activatable control valves 47a, 48b. Moreover, the boost module 40 can be removed as desired. It is further advantageous that the first pressure supply unit 5, and especially the transmission of the first pressure supply unit 5, are not exposed to pump pressure pulses, since the sequence valves 26a, 26b are closed during operation of the pumps 42. Moreover, as the second pressure supply unit 49 or the boost module 40 is arranged hydraulically between the brake master cylinder 2 and the pressure modulation device 50, a pressure build-up at the wheel brakes 8, 9, 10, 11 by the first pressure supply unit 5 in the brake-by-wire operating mode is not impaired by flow resistances of additional valves.

Figure 2:
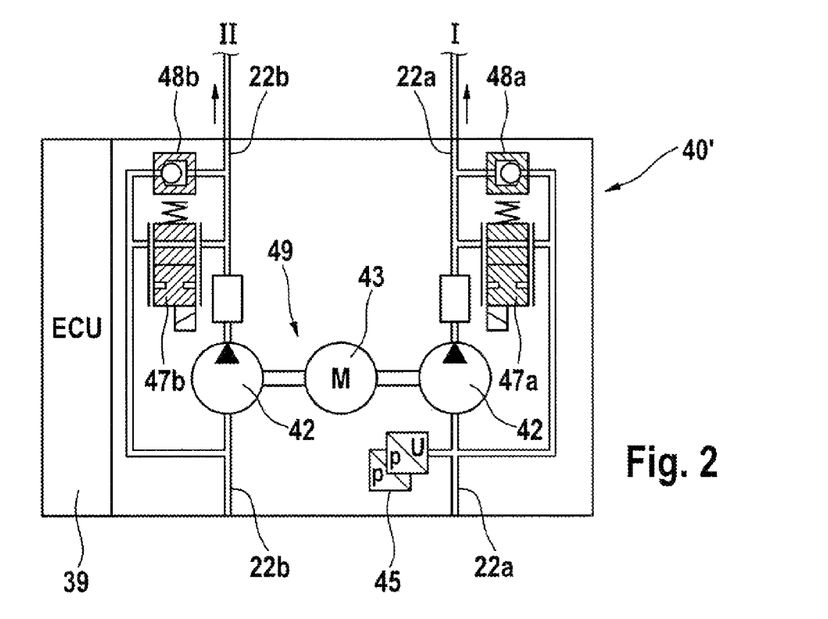
FIG. 2 shows schematically a boost module according to a second exemplary embodiment of a brake system according to the invention.

FIG. 2 shows in an enlarged representation a boost module according to a second exemplary embodiment of a brake system according to the invention. The boost module 40' corresponds substantially to the boost module 40 of the first exemplary embodiment. In deviation from the first exemplary embodiment, the pressure sensor 45 is arranged on the suction side of the pump 42 which is connected via the line 22a to the first pressure chamber 17 (corresponding to brake circuit I).

Figure 3:
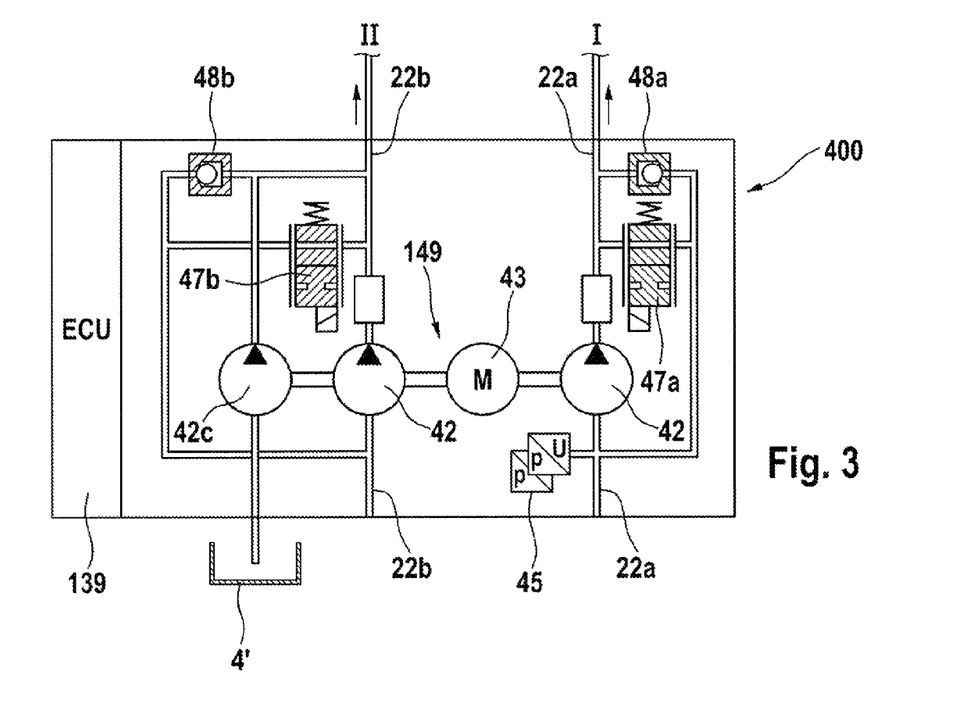
FIG. 3 shows schematically a boost module according to a third exemplary embodiment of a brake system according to the invention.

FIG. 3 shows a boost module according to a third exemplary embodiment. The boost module 400 comprises its own electronic control and regulation unit 139, a second pressure supply unit 149, a pressure sensor 45, electrically activatable control valves 47a, 47b and non-return valves 48a, 48b. The pressure supply unit 149 is formed by a three-circuit motor-pump unit 42, 42c, 43, two of the pumps 42, the pressure sensor 45 and the control valves 47a, 47b, 48a, 48b being arranged correspondingly to the second exemplary embodiment of FIG. 2, that is, being insertable in the lines 22a, 22b, so that pressure medium can be drawn from the pressure chambers 17, 18 of the brake master cylinder 2 and fed into the brake circuit supply lines 13a, 13b under increased pressure (so-called pressure boosting). The third pump 42c is used to convey additional pressure medium volume from a pressure medium reservoir 4' (so-called volume boosting). For this purpose, the suction side of the third pump 42c is connectable to a pressure medium reservoir 4', for example, a chamber of the pressure medium reservoir 4, and the pressure side is hydraulically connectable directly (on the wheel brake side of the non-return valve 48a) to the brake circuit II or to the brake circuit supply line 13b. The control and regulation unit 139 serves to activate the control valves 47a, 47b and the electric motor 43, and to provide the energy supply and signal evaluation of the pressure sensor 45. An advantage of the third exemplary embodiment is that, as a result of the boost module 400, not only smaller brake pedal forces but also shorter brake pedal travels can be achieved in the boosted fallback level.

While the above description constitutes the preferred embodiment of the present invention, it will be appreciated that the invention is susceptible to modification, variation, and change without departing from the proper scope and fair meaning of the accompanying claims.

The invention claimed is:

1. A brake system for motor vehicles which in a brake-by-wire operating mode is configured to be activatable both by the vehicle driver and independently of the vehicle driver, and is normally operated in the brake-by-wire operating mode and which is configured to be operated in at least one fallback operating mode, comprising a brake master cylinder having a housing and two pistons which define in the housing a first pressure chamber and a second pressure chamber, the first pressure chamber having a first brake circuit associated therewith and being selectively connectable thereto, the first brake circuit having one or more wheel brakes associated therewith, and the second pressure chamber having a second brake circuit associated therewith and selectively connectable thereto, the second brake circuit having one or more wheel brakes is associated therewith, a brake pedal coupled to the brake master cylinder for actuating the brake master cylinder, a first electrically operable, normally open isolation valve for the first brake circuit and a second electrically operable, normally open isolation valve for the second brake circuit, the first and second isolation valves for isolating the first and second pressure chambers from the respective first and second brake circuits, the first isolation valve associated with the first pressure chamber and first brake circuit, the second isolation valve associated with the second pressure chamber and the second brake circuit, a respective electrically operable, normally open inlet valve and a respective electrically operable, normally closed outlet valve for each individual wheel brake for setting wheel-individual brake pressures of a pressure medium, the respective inlet valve and outlet valve for each individual wheel brake defining a respective valve pair such that there a number of respective valve pairs corresponding to the number of wheel brakes, each individual valve pair of the multiple valve pairs being associated with the first brake circuit or the second brake circuit, wherein the first brake circuit has one or more associated wheel brakes and a corresponding number of one or more valve pairs, and the second brake circuit has one or more associated wheel brakes a corresponding number of one or more valve pairs, a first electrically controllable pressure supply unit having a cylinder-piston arrangement with a piston which is operable by an electro mechanical actuator, a first electrically operable normally closed sequence valve for the first brake circuit and a second electrically operable normally closed sequence valve for the second brake circuit, the first sequence valve being for hydraulically connecting the first pressure supply unit to the first brake circuit, the second sequence valve being for hydraulically connecting the first pressure supply unit to the second brake circuit, the first sequence valve associated with the first brake circuit, the second sequence valve associated with the second brake circuit, a simulation device which is hydraulically connectable by means of an electrically or mechanically operable simulator release valve to at least one of the first and second pressure chambers of the brake master cylinder and which communicates to the vehicle driver a predetermined brake pedal feel in the brake-by-wire operating mode, a first electronic control and regulation unit for activating the first pressure supply unit, the first and second isolation valves, the first and second sequence valves, and the simulator release valve, and a second electrically controllable pressure supply unit having at least one intake port selectively connectable to one of the first and second pressure chambers and at least one pressure port, the at least one intake port including a first intake port and the at least one pressure port including a first pressure port, wherein the first intake port is selectively connectable to a selected one of the first and second pressure chambers and the first pressure port is connected to the first or second brake circuit associated with the selected one of the first and second pressure chambers, the pressure supply unit being configured to draw pressure medium from the selected one of the first and second pressure chambers in an unenergized state of the first and second isolation valves and of the inlet valves and the outlet valves.

2. The brake system as claimed in claim 1, further comprising in that the second pressure supply unit is arranged hydraulically between the first or second isolation valve associated with the selected one of the first and second pressure chambers and the first or second the brake circuit associated with the selected one of the first and second pressure chambers, the first intake port being connected to an outlet connection of the first or second isolation valve associated with the selected one of the first and second pressure chambers and the first pressure port being connected to an inlet connection of the one or more inlet valves associated with the first or second brake circuit associated with the selected one of the first and second pressure chambers.

3. The brake system as claimed in claim 1 further comprising in that the second pressure supply unit includes a first hydraulic pump and a second hydraulic pump, the first and second hydraulic pumps being driven by an electric motor, the first pump having the first intake port and the first pressure port, the second pump having a second intake port and a second pressure port, the first intake port of the first pump being selectively connectable to the selected one of the first and second pressure chambers and the second intake port of the second pump being selectively connectable to a selected other of the first and second pressure chambers, the first intake port being connected to the first or second isolation valve associated with the selected one of the first and second pressure chambers, the second intake port being connected to the first or second isolation valve associated with the selected other of the first and second pressure chambers, and the first pressure port of the first pump being connected to the first or second brake circuit associated with the selected one of the first and second pressure chambers, and the second pressure port of the second pump being connected to the first or second brake circuit associated with the selected other of the first and second pressure chambers.

4. The brake system as claimed in claim 3, further comprising in that there is provided for the first pump a first control valve associated therewith and for the second pump a second control valve associated therewith, the first and second control valves being electrically operable and activatable by analog means, the first control valve being connected in parallel to the first pump and the second control valve being connected in parallel to the second pump.

5. The brake system as claimed in claim 4, further comprising in that a first non-return valve is connected in parallel to the first control valve and a second non-return valve is connected in parallel to the second control valve, the first and second control valves enabling the pressure medium to flow from the first and second pressure chambers of the brake master cylinder to the first and second brake circuits independently of the switching state of the first and second control valves.

6. The brake system as claimed in claim 3 further comprising in that the second pressure supply unit includes a third pump having a third intake port, the third intake port is connected to a pressure medium reservoir and a discharge volume flow of the third pump is interconnected with a discharge volume flow of one of the first and second pumps.

7. The brake system as claimed in claim 1 further comprising in that there is provided a pressure detection device which detects the pressure medium pressure at the first intake port of the second pressure supply unit.

8. The brake system as claimed in claim 5 further comprising in that there is provided a pressure detection device which detects the pressure medium pressure at the first intake port of the second pressure supply unit, and a second electronic control and regulation unit for activating the second pressure supply unit, and the first and second control valves is provided, to which second electronic control and regulation unit output signals of the pressure detection device are supplied.

9. The brake system as claimed in claim 8, further comprising in that the second pressure supply unit, the first and second control valves and the first and second non-return valves, the pressure detection device and the second electronic control and regulation unit are arranged in an independent assembly.

10. The brake system as claimed in claim 9 further comprising in that the second pressure supply unit, the first and second control valves, the pressure detection device and the second electronic control and regulation unit, and the independent assembly, are supplied with energy by an independent electrical energy source.

11. A method for operating the brake system of claim 1, the method comprising the steps of:
provided the brake system,
operating the brake system wherein in an unenergized state of the first and second isolation valves and of the inlet valves and the outlet valves of the brake system, by means of the second electrically controllable pressure supply unit wherein the pressure medium is drawn from the selected one of the first and second pressure chambers of the brake master cylinder and fed in a pressure-boosted manner into the first or second brake circuit associated with the selected one of the first and second pressure chamber of the brake circuits (I, II), if a pressure build-up or pressure reduction cannot be carried out by means of the first pressure supply unit and the vehicle driver actuates the brake pedal.

12. The method as claimed in claim 11, further comprising in that the first control and regulation unit (12) outputs a confirmation signal (53) to a second control and regulation unit (39, 139) which is configured to activate the second pressure supply unit (49, 149), for as long as pressure is built up or reduced by means of the first pressure supply unit (5).

13. The method as claimed in claim 12 further comprising in that an actuation of the brake pedal is recognized by means of a pressure detection device which detects the pressure medium pressure at the first intake port of the second pressure supply unit.

14. The method as claimed in claim 13, further comprising in that the signals of the pressure detection device are outputted to the second control and regulation unit and are evaluated in the second control and regulation unit.

15. The method as claimed in claim 11 further comprising in that the second pressure supply unit is in the form of an at least dual-circuit motor-pump unit and in that control of the pressure medium flow emitted by the motor-pump unit is carried out
by means of speed control of the motor-pump unit, or
by means of valve flow control of a control valve, activatable by analog means, which is connected in parallel to a pump of the motor-pump unit.

* * * * *

UNITED STATES PATENT AND TRADEMARK OFFICE
CERTIFICATE OF CORRECTION

PATENT NO. : 9,205,824 B2  
APPLICATION NO. : 14/112446  
DATED : December 8, 2015  
INVENTOR(S) : Hans-Jörg Feigel and Harald Biller Page 1 of 1

It is certified that error appears in the above-identified patent and that said Letters Patent is hereby corrected as shown below:

In the Claims

Column 12, claim 2, line 5, after "or" insert --the-- and after "second", delete "the".

Signed and Sealed this
Twenty-ninth Day of March, 2016

Michelle K. Lee
*Director of the United States Patent and Trademark Office*